United States Patent
Dhar et al.

(10) Patent No.: US 11,774,324 B2
(45) Date of Patent: Oct. 3, 2023

(54) SYSTEM AND METHOD FOR DETECTING ACTUAL SLIP IN A COUPLING OF A ROTARY SHAFT

(71) Applicant: General Electric Renovables Espana, S.L., Barcelona (ES)

(72) Inventors: Sandeep Dhar, Bangalore (IN); Luv Verma, Bangalore (IN); Hiteshkumar Rameshchandra Mistry, Bangalore (IN); Dinesh Rakwal, Bangalore (IN); Rwitam Mitra, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 75 days.

(21) Appl. No.: 17/199,535

(22) Filed: Mar. 12, 2021

(65) Prior Publication Data

US 2022/0291084 A1  Sep. 15, 2022

(51) Int. Cl.
*G01M 13/022* (2019.01)
*F03D 17/00* (2016.01)
*G05B 13/02* (2006.01)

(52) U.S. Cl.
CPC .......... *G01M 13/022* (2013.01); *F03D 17/00* (2016.05); *G05B 13/0265* (2013.01); *F05B 2270/80* (2013.01)

(58) Field of Classification Search
CPC ...... G01M 13/022; F03D 17/00; F03D 7/046; F03D 15/00; G05B 13/0265;

(Continued)

(56) References Cited

U.S. PATENT DOCUMENTS

| | | |
|---|---|---|
| 4,605,107 A | 8/1986 | Hallidy et al. |
| 4,660,697 A | 4/1987 | Yoneda et al. |

(Continued)

FOREIGN PATENT DOCUMENTS

| | | | | |
|---|---|---|---|---|
| CN | 202645849 U | | 1/2013 | |
| CN | 105510026 A | * | 4/2016 | .......... G01M 13/022 |

(Continued)

OTHER PUBLICATIONS

Ahmar et al., Advanced Signal Processing Techniques for Fault Detection and Diagnosis in a Wind Turbine Induction Generator Drive Train: A Comparative Study, 5617707, 2010 IEEE Energy Conversion Congress and Exposition, Atlanta, GA, 2010, pp. 3576-3581. (Astract Only) https://ieeexplore.ieee.org/documents/5617707.

(Continued)

*Primary Examiner* — Catherine T. Rastovski
*Assistant Examiner* — Yossef Korang-Beheshti
(74) *Attorney, Agent, or Firm* — Dority & Manning, P.A.

(57) ABSTRACT

A method for detecting actual slip in a coupling of a rotary shaft, for example, in a wind turbine power system, includes monitoring, via a controller, a plurality of sensor signals relating to the coupling for faults. In response to detecting a fault in the plurality of sensor signals relating to the coupling, the method includes determining, via the controller, whether the fault is indicative of an actual slip or a no-slip event of the coupling using one or more classification parameters. When the fault is indicative of the actual slip, the method includes estimating, via the controller, a magnitude of the actual slip using the plurality of sensor signals and a time duration of the actual slip. Further, the method includes implementing, via the controller, a control action based on the magnitude of the actual slip in the coupling.

15 Claims, 7 Drawing Sheets

(58) Field of Classification Search
CPC .............. F05B 2270/80; F05B 2260/84; F05B 2260/40; F05B 2270/309; Y02E 10/72
See application file for complete search history.

(56) References Cited

U.S. PATENT DOCUMENTS

| | | | |
|---|---|---|---|
| 8,123,478 | B2 | 2/2012 | Ahmann |
| 8,317,462 | B2 | 11/2012 | Daniels et al. |
| 8,332,164 | B2 | 12/2012 | Castell Martinez |
| 8,364,424 | B2 | 1/2013 | Lou et al. |
| 8,692,400 | B2 | 4/2014 | Lee |
| 9,423,290 | B2 | 8/2016 | Sakaguchi et al. |
| 9,458,835 | B2 | 10/2016 | Ikeda et al. |
| 9,835,136 | B2 | 12/2017 | Haj-Maharsi |
| 10,006,441 | B2 | 6/2018 | Schindele et al. |
| 10,047,726 | B2 | 8/2018 | Sakaguchi |
| 10,352,795 | B2 | 7/2019 | De Bauw et al. |
| 10,473,708 | B2 | 11/2019 | Rodriguez Izal et al. |
| 10,519,935 | B2 | 12/2019 | Sakaguchi et al. |
| 10,570,887 | B2 | 2/2020 | Son et al. |
| 10,590,915 | B2 | 3/2020 | Takahashi |
| 10,655,607 | B2 | 5/2020 | Potter et al. |
| 2012/0219418 | A1 | 8/2012 | Ingerslew et al. |
| 2013/0268133 | A1 | 10/2013 | Siegfriedsen |
| 2015/0134189 | A1 | 5/2015 | Wash |
| 2016/0017865 | A1* | 1/2016 | Illing ................ F03D 7/0224 416/1 |
| 2016/0187226 | A1 | 6/2016 | Tsutsui et al. |
| 2017/0260968 | A1 | 9/2017 | Tsutsui et al. |
| 2018/0224324 | A1 | 8/2018 | Ikeda et al. |
| 2018/0328345 | A1 | 11/2018 | Rogg |
| 2019/0033169 | A1 | 1/2019 | Kamiya et al. |
| 2019/0101103 | A1 | 4/2019 | Haseba et al. |
| 2019/0128243 | A1 | 5/2019 | Hasan et al. |
| 2019/0195192 | A1 | 6/2019 | Takahashi |
| 2020/0025648 | A1 | 1/2020 | Haseba |
| 2020/0033411 | A1* | 1/2020 | Tabuchi ............. G01H 11/08 |
| 2020/0063710 | A1* | 2/2020 | Farrokhabadi ........ F03D 17/00 |
| 2020/0143292 | A1* | 5/2020 | Huang ............... G06N 20/10 |
| 2020/0158562 | A1 | 5/2020 | Hatakeyama et al. |
| 2023/0030681 | A1* | 2/2023 | Cole ................ G05B 23/0281 |

FOREIGN PATENT DOCUMENTS

| | | | | |
|---|---|---|---|---|
| CN | 107178503 | A | * 9/2017 | .............. F04C 29/12 |
| CN | 107179503 | A | * 9/2017 | ........... G01R 31/343 |
| CN | 108386324 | A | 8/2018 | |
| CN | 108757340 | A | 11/2018 | |
| CN | 110132581 | A | 8/2019 | |
| CN | 110174264 | A | 8/2019 | |
| EP | 2115412 | A2 | 11/2009 | |
| EP | 2431714 | A1 | 3/2012 | |
| EP | 2992209 | A1 | 3/2016 | |
| EP | 3168463 | A1 | 5/2017 | |
| WO | WO2015/012124 | A1 | 1/2015 | |
| WO | WO2016/091945 | A1 | 6/2016 | |
| WO | WO2017/163839 | A1 | 9/2017 | |
| WO | WO 2019/122311 | A1 | 6/2019 | |

OTHER PUBLICATIONS

Artigao et al., The Use of Electrical Measurements of Wind Turbine Generators for Drive Train Condition Monitoring, Design Optimization of Wind Energy Conversion Systems with Applications, INTECHOPEN, 2020, 26 Pages. (Abstract Only) https://www.inechopen.com/books/design-optimization-of-wind-energy-conversion-systems-with-applications/the-use-of-electrical-measurements-of-wind-turbine-generators-for-drive-train-condition-monitoring.

Asgari et al., Robust Model-Based Fault Diagnosis of Mechanical Drive Train in V47/660 kW Wind Turbine, Springer Link, Energy Systems, vol. 9, 2018, pp. 921-952. (Abstract Only) https://link.springer.com/article/10.1007%2Fs12667-017-0231-2.

Chammas et al., Fault Diagnosis of Wind Turbine Drive Train Faults Based on Dyanamical Clustering, IEEE Explore, 52$^{nd}$ IEEE Conference on Decision and Control, Dec. 10-13, 2013, Firenze Italy, pp. 5650-5655. (Abstract Only) https://doi.org/10.1109/CDC.2013.6760779.

Jiang et al., Research of Electromechanical Simulation Model of Wind Turbine Drive Train Fault Diagnosis, CNKI, 1 Page. (Abstract Only) http://en.cnki.com.en/Article_en/CJFDTotal-DJKZ201607012.htm.

Kallstrom, On-Board Feature Extraction for Clutch Slippage Deviation Detection, Lulea University of Technology, Licentiate Thesis, 2015, 116 Pages. http://www.diva-portal.org/smash/get/diva2:999832/FULLTEXT01.pdf.

Li et al., Fault Diagnosis of Wind Turbine Drive Train Using Time-Frequency Estimation and CNN, IEEE Explore 8942851, 2019 Prognostics and System Health Management Conference (PHM-Qindao), Qingdao China, 2019, 3 Pages. (Abstract Only) https://ieeexplore.ieee.org/document/8942851.

Liu et al., Research on Fault Diagnosis of Drive Train in Wind Turbine Based on EMD and LSSVM, Advanced Materials Research, vol. 512-515, 2012, pp. 763-770. (Abstract Only) https://www.scientific.net/AMR.512-515.763 https://doi.org/10.4028/www.scientific.net/AMR.512-515.763.

Maheswari, Fault Diagnosis of Wind Turbine Drive-Train Using Multivariate Signal Processing, International Journal of Acoustics and Vibration, vol. 24, No. 2, 2019, pp. 334-342. https://pdfs.semanticscholar.org/fd95/dec2d5e02bd375c4e23a471def9ee65821d4.pdf.

Nirosha et al., Condition Monitoring of Arrow Dynamic and Drive Train in Wind Turbine Using Artificial Intelligence, International Journal of Computer Science and Engineering Communications (IJCSEC), vol. 2, Issue 3, May 2014, 4 Pages. http://www.hindex.org/2014/1V2I3399402.pdf.

Romero et al., Condition Monitoring of a Wind Turbine Drive Train Based on its Pwoer Dependent Vibrations, Renewable Energy, vol. 123, Aug. 2018,, pp. 817-827. (Abstract Only) https://www.sciencedirect.com/science/article/abs/pii/S0960148117307139.

Shi et al., Fault Diagnosis Simulation Model Study of Wind Turbine Drive Train Based on SIMULINK, 22788, International Power, Electronics and Materials Engineering Conference (IMPEMEC 2015), Atlantis Press, Advances in Engineering Research, May 2015, 5 Pages. https://www.atlantis-press.com/proceedings/ipemec-15/22788 https://dx.doi.org/10.2991/ipemec-15.2015.81.

Shi et al., OFFSHORE 2015, European Wind Energy Association (EWEA), Conference Programme, Bella Center Copenhagen Denmark, Mar. 10-12, 2 Pages. (Abstract Only) http://www.ewea.org/offshore2015/conference/programme/info2.php?id2=266&id=26%20&ordre=9#top.

Wilkinson et al., Extracting Condition Monitoring Information from a Wind Turbine Drive Train, IEEE Explore, 39$^{th}$ International Universities Power Engineering Conference, vol. 1, https://ieeexplore.ieee.org/abstract/document/1492088.

Yang et al., Condition Monitoring and Fault Diagnosis of a Wind Turbine Synchronous Generator Drive Train, IET Renewable Power Generator, 20080006, The Institution of Engineering and Technology, vol. 3, No. 1, Apr. 2009, pp. 1-11. https://www.researchgate.net/deref/http%3A%2F%2Fdx.doi.org%2F10.1049%2Fiet-rpg%3A20080006.

Yang, Condition Monitoring the Drive Train of a Direct Drive Permanent Magnet Wind Turbine Using Generator Electrical Signals, Journal of Solar Energy Engineering, 021008-379726, vol. 136, Issue 2, May 2014, 8 Pages. (Abstract Only) https://asmedigitalcollection.asme.org/solarenergyengineering/article-abstract/136/2/021008/379726/Condition-Monitoring-the-Drive-Train-of-a-Direct.

Yang et al., Sparse Time-Frequency Representation for Incipient Fault Diagnosis of Wind turbine Drive Train, IEEE Xplore, IEEE Transactions on Instrumentation and Measurement, vol. 67, No. 11, Nov. 2018, pp. 2616-2627. (Abstract Only) https://ieeexplore.ieee.org/abstract/document/8361776.

Yu, Wind Turbine Data Analytics for Drive-Train Failure Early Detection and Diagnosis, ASME 2011 Turbo Expo, Turbine Technical Conference and Exposition, GT2011-45101, vol. 1: Aircraft (56) References Cited

OTHER PUBLICATIONS

Engine; Ceramics; Coal, Biomass and Alternative Fuels; Wind Turbine Technology, Vancouver British Columbia Canada, Jun. 6-10, 2011, pp. 721-728. (Abstract Only) https://doi.org/10.1115/GT2011-45101.

European Search Report for EP application No. 22156546.8, dated Aug. 8, 2022.

* cited by examiner

SYSTEM AND METHOD FOR DETECTING ACTUAL SLIP IN A COUPLING OF A ROTARY SHAFT

FIELD

The present disclosure relates generally to wind turbine power systems, and, more particularly, to systems and methods for detecting actual slip, and thus rejecting a no slip event, in a shaft coupling of a wind turbine power system.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a rotor shaft, often referred to as a low-speed shaft, coupling the rotor blades to a gearbox, or if a gearbox is not used, directly to the generator. The generator then converts the mechanical energy to electrical energy that may be deployed to a utility grid.

More specifically, in certain wind turbines, the hub is rotatably coupled to the generator via a rotor shaft (sometimes referred to as either a main shaft or a low speed shaft), the gearbox, a high-speed shaft, and a coupling. Thus, rotation of rotor shaft rotatably drives the gearbox that subsequently drives the high-speed shaft. The high-speed shaft rotatably drives the generator with the coupling and rotation of high-speed shaft facilitates production of electrical power by the generator.

In such wind turbines, any slip fault related to the shaft coupling that is triggered in the field requires visual inspection to check the cause of the fault. Based on data, almost 80% of the triggered slip faults are not actual slip events and should not have led to a wind turbine shut down, which causes a significant loss in power production and incurs considerable services costs.

Therefore, in view of the aforementioned, systems and methods for detecting actual slip and rejecting a no slip event in a shaft coupling of a wind turbine power system would be welcomed in the art.

BRIEF DESCRIPTION

Aspects and advantages of the disclosure will be set forth in part in the following description, or may be obvious from the description, or may be learned through practice of the disclosure.

In an aspect, the present disclosure is directed to a method for detecting actual slip (and thus rejecting a no slip event) in a coupling of a rotary shaft. The method includes monitoring, via a controller, a plurality of sensor signals relating to the coupling for faults. In response to detecting a fault in the plurality of sensor signals relating to the coupling, the method includes determining, via the controller, whether the fault is indicative of an actual slip or a no-slip event of the coupling using one or more classification parameters. When the fault is indicative of the actual slip, the method includes estimating, via the controller, a magnitude of the actual slip using the plurality of sensor signals and a time duration of the actual slip. Further, the method includes implementing, via the controller, a control action based on the magnitude of the actual slip in the coupling.

In an embodiment, the plurality of sensor signals may include, for example, generator speed, rotor speed, generator torque demand, drivetrain acceleration, one or more electrical signals, wind speed, pitch angle, a system operational state, and/or functions thereof. In another embodiment, the classification parameter(s) may include a difference in amplitude in the plurality of sensor signals, a rate of change in the plurality of sensor signals, an absolute value of the plurality of sensor signals, or statistical analysis of the plurality of sensor signals, and/or similar.

In another embodiment, determining whether the fault is indicative of the actual slip or the no-slip event of the coupling using one or more classification parameter may include using at least one of the difference in the amplitude in the plurality of sensor signals, the rate of change in the plurality of sensor signals, the absolute value of the plurality of sensor signals, and/or the statistical analysis of the plurality of sensor signals to detect a difference between the faults having actual slip and the faults having only no-slip events.

In further embodiments, the method may include estimating the magnitude of the actual slip using the plurality of sensor signals and the time duration of the actual slip via a computer-implemented model programmed in the controller or a cloud server. Further, the controller may be utilized online or offline.

In additional embodiments, the method may include developing the computer-implemented model using training data and testing data. In such embodiments, developing the computer-implemented model using training data and testing data may include training the computer-implemented model using, at least, the training data. In such embodiments, the computer-implemented model may include a supervised learning-based algorithm, such as a machine learning algorithm or artificial intelligence. Thus, in an embodiment, the method may include testing the computer-implemented model using the testing data and output data from the supervised learning-based algorithm.

In further embodiments, the method includes comparing an accuracy of the computer-implemented model with an accuracy threshold for the time duration. When the accuracy of the computer-implemented model is greater than the accuracy threshold, the method may include optionally further training the computer-implemented model with new learning data from the time duration. In contrast, when the accuracy of the computer-implemented model is less than the accuracy threshold, the method includes tuning the computer-implemented model or receiving additional data.

In several embodiments, the method may include developing the computer-implemented model using the training data and the testing data prior to monitoring the plurality of sensor signals relating to the coupling for faults.

In another embodiment, the method may include continuously training and updating the computer-implemented model using the training data, the testing data, the output data from the supervised learning-based algorithm, and the new learning data.

In particular embodiments, the plurality of sensor signals may be raw measurements from one or more sensors. In addition, or in the alternative, the method may include processing the plurality of sensor signals using one or more processing algorithms.

In certain embodiments, the rotary shaft may be coupled to a high-speed shaft of a generator of a wind turbine power system.

In another aspect, the present disclosure is directed to a system for detecting actual slip (and thus rejecting a no slip event) in a coupling of a rotary shaft of a wind turbine power system. The system includes a controller having at least one processor with at least one computer-implemented model programmed therein. The computer-implemented model(s) is configured to implement a plurality of operations, including but not limited to receiving a plurality of sensor signals relating to the coupling for faults, in response to detecting a fault in the plurality of sensor signals relating to the coupling, determining whether the fault is indicative of an actual slip or a no-slip event of the coupling using one or more classification parameters, and when the fault is indicative of the actual slip, estimating, via the computer-implemented model, a magnitude of the actual slip using the plurality of sensor signals and a time duration of the actual slip. Further, the processor(s) is configured to implement a control action based on the magnitude of the actual slip in the coupling.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Generally, the present disclosure is directed to systems and methods for automated classification of actual slip events upon triggering of the corresponding faults in a wind turbine power system. In addition, the systems and methods of the present disclosure can also estimate the magnitude of the slip that may have occurred during the fault, e.g., using sensor data from the wind turbine power system. More particularly, in an embodiment, for the purpose of classification, the systems and methods of the present disclosure can evaluate the difference in amplitudes of the sensor signals, the rate of change of the sensor signals, and/or the absolute amplitudes of the sensor signals to detect the difference between flagged slip events that had actual slip and those flagged events when no-slip was present. Such sensor signals may include, for example, generator speed, rotor speed, drive-train acceleration, one or more electrical signals, wind speed, pitch angle, a system operational state, and/or generator torque demand. Further, in an embodiment, the sensor signals may be used raw or manipulated based on signal processing algorithms. As such, the processed sensor signals may also be used to make predictions and estimations. More specifically, in an embodiment, for estimating the slip magnitude, an empirical model may be developed based on the sensor data and the reported slip for the time duration. Accordingly, in such embodiments, the model has an inherent capability to improve its prediction based on the any new fault data with data available for sensors.

Figure 1:
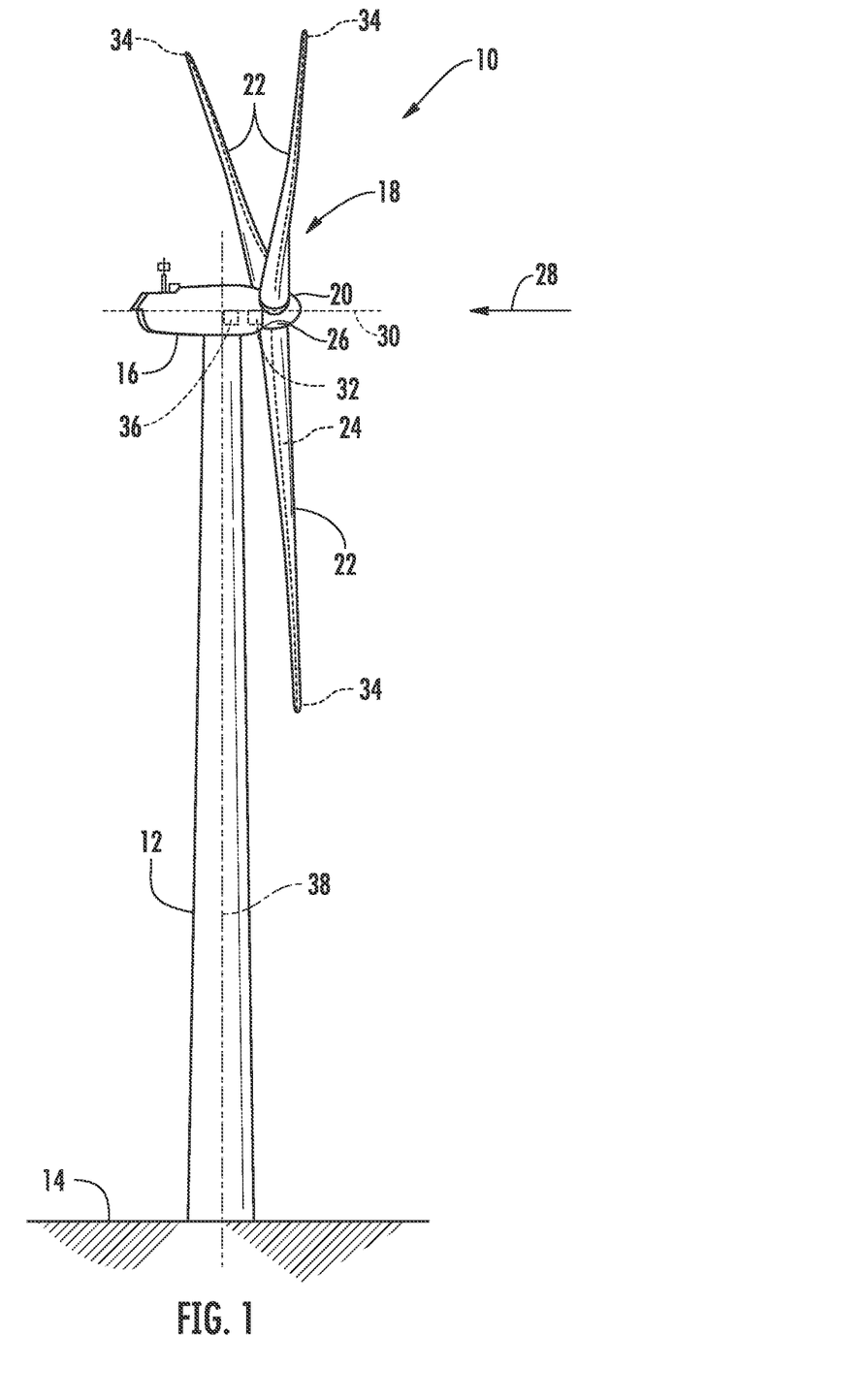
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. In the illustrated embodiment, the wind turbine 10 is a horizontal-axis wind turbine. Alternatively, the wind turbine 10 may be a vertical-axis wind turbine. In addition, as shown, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from hub 20. Moreover, as shown, the rotor 18 has three rotor blades 22. In an alternative embodiment, the rotor 18 includes more or less than three rotor blades 22. In an embodiment, the tower 12 is fabricated from tubular steel to define a cavity (not shown in FIG. 1) between support system 14 and nacelle 16. In an alternative embodiment, the tower 12 is any suitable type of tower having any suitable height.

The rotor blades 22 are spaced about the hub 20 to facilitate rotating the rotor 18 to enable kinetic energy to be transferred from the wind into usable mechanical energy, and subsequently, electrical energy. Further, the rotor blades 22 are generally secured to the hub 20 by coupling a blade root portion 24 to the hub 20 at a plurality of load transfer regions 26. The load transfer regions 26 have a hub load transfer region and a blade load transfer region (both not shown in FIG. 1). As such, loads induced to the rotor blades 22 are transferred to the hub 20 via the load transfer regions 26.

Thus, as wind strikes the rotor blades 22 from a direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle or blade pitch of the rotor blades 22, i.e., an angle that determines a perspective of the rotor blades 22 with respect to the direction 28 of the wind, may be changed by a pitch adjustment system 32 to control the load and power generated by the wind turbine 10 by adjusting an angular position of at least one rotor blade 22 relative to wind vectors. Pitch axes 34 for the rotor blades 22 are shown. During operation of the wind turbine 10, the pitch adjustment system 32 may change a blade pitch of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed of the rotor 18 and/or facilitates a stall of the rotor 18.

In one embodiment, a blade pitch of each rotor blade 22 is controlled individually by a controller 36. Alternatively, the blade pitch for all rotor blades 22 may be controlled simultaneously by the controller 36. Further, in an embodiment, as the direction 28 changes, a yaw direction of the nacelle 16 may be controlled about a yaw axis 38 to position the rotor blades 22 with respect to the direction 28.

In an embodiment, the controller 36 is shown as being centralized within the nacelle 16, however, the controller 36 may be a distributed system throughout the wind turbine 10, on the support system 14, within a wind farm, and/or at a remote control center.

Figure 2:
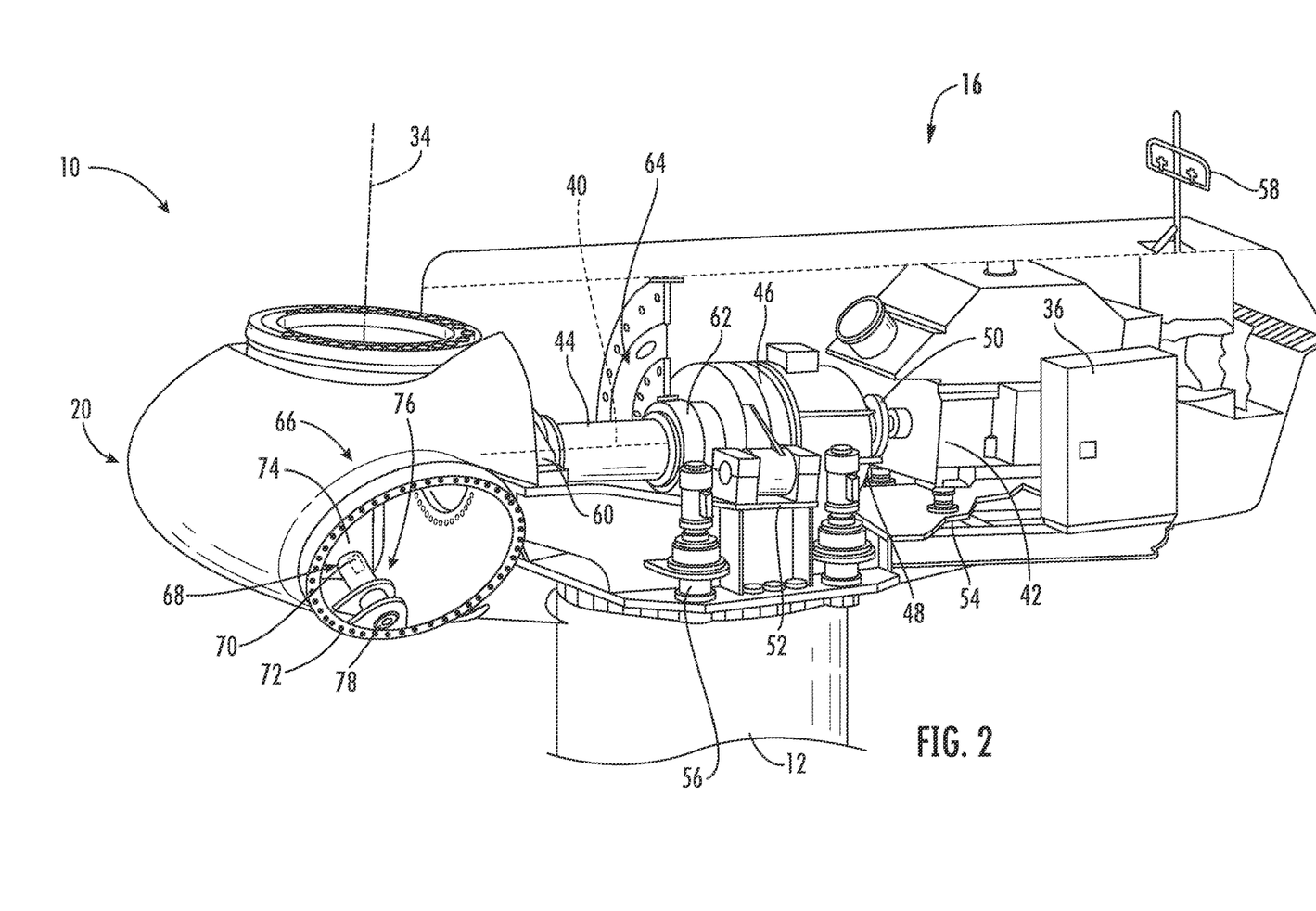
FIG. 2 illustrates an enlarged sectional view of a portion of the wind turbine shown in FIG. 1.

Referring now to FIG. 2, an enlarged sectional view of a portion of the wind turbine 10 is illustrated according to the present disclosure. In an embodiment, the hub 20 is rotatably coupled to a generator 42 positioned within the nacelle 16 by rotor shaft 44 (sometimes referred to as either a main shaft or a low speed shaft), a gearbox 46, a high-speed shaft 48, and a coupling 50. In an embodiment, the rotor shaft 44 is disposed coaxial to longitudinal axis 40. Rotation of the rotor shaft 44 rotatably drives the gearbox 46 that subsequently drives the high-speed shaft 48. The high-speed shaft 48 rotatably drives the generator 42 with the coupling 50 and rotation of the high-speed shaft 48 facilitates production of electrical power by the generator 42. The gearbox 46 and the generator 42 are supported by supports 52, 54. Further, in an embodiment, the gearbox 46 utilizes a dual path geometry to drive the high-speed shaft 48. Alternatively, the rotor shaft 44 is coupled directly to the generator 42 with the coupling 50.

The nacelle 16 also includes a yaw drive mechanism 56 that may be used to rotate the nacelle 16 and the hub 20 on a yaw axis 38 (shown in FIG. 1) to control the perspective of rotor blades 22 with respect to direction 28 of the wind. The nacelle 16 also includes at least one meteorological mast 58 that includes a wind vane and anemometer (neither shown in FIG. 2). As such, in an embodiment, the mast 58 provides information to the controller 36 that may include wind direction and/or wind speed. In addition, as shown in the illustrated embodiment, the nacelle 16 also includes a main forward support bearing 60 and a main aft support bearing 62.

Still referring to FIG. 2, the forward support bearing 60 and the aft support bearing 62 facilitate radial support and alignment of the rotor shaft 44. The forward support bearing 60 is coupled to the rotor shaft 44 near the hub 20. The aft support bearing 62 is positioned on the rotor shaft 44 near the gearbox 46 and/or the generator 42. Alternatively, the nacelle 16 includes any number of support bearings that enable the wind turbine 10 to function as disclosed herein. The rotor shaft 44, the generator 42, the gearbox 46, the high-speed shaft 48, the coupling 50, and/or any associated fastening, support, and/or securing device including, but not limited to, the supports 52, 54, and the forward support bearing 60 and aft support bearing 62, are sometimes referred to as a drive train 64, in the example as geared drive train.

In other examples, the geared drive train 64 is replaced by a direct-drive train. For example, a comparatively long main shaft connects the hub 20 and the generator 42. The main shaft 44 and the generator shaft 48 are typically coupled via a conical sleeve coupling. The main shaft 44 is typically supported by a front bearing, for example a spherical roller bearing, next to the hub 20 and a rear bearing, for example a CARB bearing, next to the generator 42. The front bearing and the rear bearing are connected to a bedplate and configured to transfer axial loads and bending loads to the bedplate mounted to nacelle 16. The generator 42 is hanging on the main shaft 44. Further torque beams may be provided between the generator 42 and the bedplate to transfer torque to the bedplate during operation of the wind turbine 10.

In an embodiment, the hub 20 may also include a pitch assembly 66. For example, as shown in FIG. 2, the pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In an embodiment, the pitch assembly 66 includes at least one pitch bearing 72 coupled to the hub 20 and to the respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to the pitch drive pinion 78 such that the rotation of the pitch drive pinion 78 causes rotation of the pitch bearing 72. More specifically, in an embodiment, the pitch drive pinion 78 is coupled to the pitch bearing 72 such that rotation of the pitch drive gearbox 76 rotates the pitch bearing 72 and the rotor blade 22 about the pitch axis 34 to change the blade pitch of the rotor blade 22. Further, the pitch drive system 68 is coupled to the controller 36 for adjusting the blade pitch of the rotor blade(s) 22 upon receipt of one or more signals from the controller 36.

Figure 3:
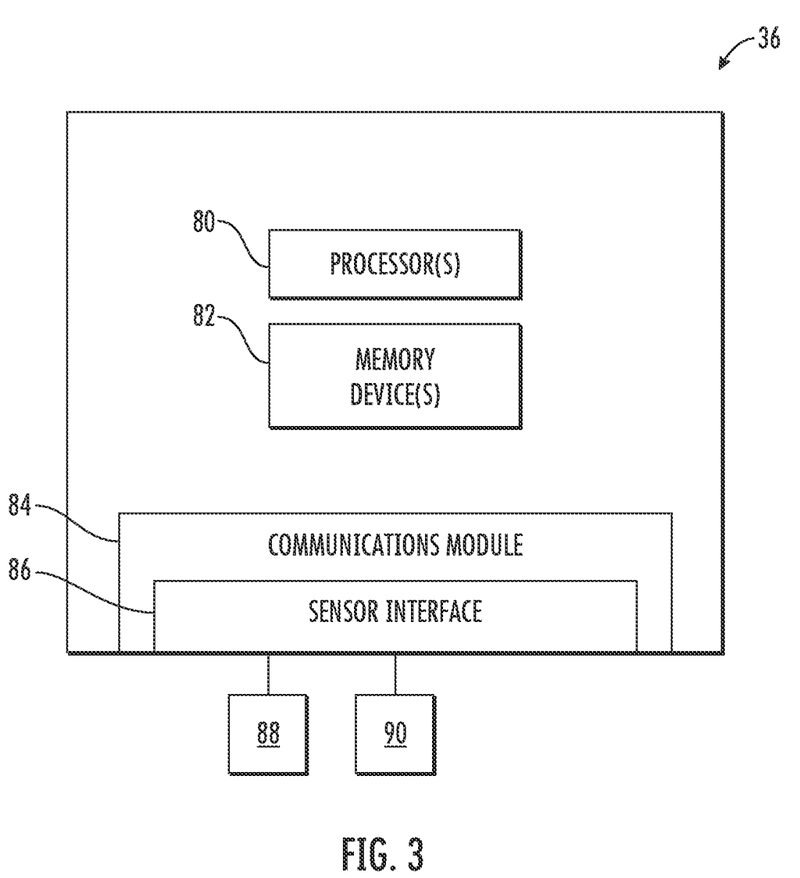
FIG. 3 illustrates a block diagram of one embodiment of suitable components that may be included in a controller of a wind turbine according to the present disclosure.

Referring now to FIG. 3, a block diagram of one embodiment of suitable components that may be included within the controller 36 in accordance with aspects of the present disclosure is illustrated. It should be understood that the various components of the controller of FIG. 3 may be applicable to any suitable controller, including for example, a turbine controller, a farm-level controller, a supervisory controller, and/or other suitable control system.

As shown, the controller 36 may include one or more processor(s) 80 and associated memory device(s) 82 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 82 may generally include memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller 36 may also include a communications module 84 to facilitate communications between the controller 36 and the various components of the wind turbine 10. For instance, the communications module 84 may include a sensor interface 86 (e.g., one or more analog-to-digital converters) to permit the signals transmitted by one or more sensors 88, 90 to be converted into signals that can be understood and processed by the controller 36. It should be appreciated that the sensors 88, 90 may be communicatively coupled to the communications module 84 using any suitable means. For example, as shown in FIG. 3, the sensors 88, 90 are coupled to the sensor interface 86 via a wired connection. However, in other embodiments, the sensors 88, 90 may be coupled to the sensor interface 86 via a wireless connection, such as by using any suitable wireless communications protocol known in the art. As such, the processor 80 may be configured to receive one or more signals from the sensors 88, 90.

The sensors 88, 90 of the wind turbine 10 may be any suitable sensors configured to measure any operational condition and/or wind parameter at or near the wind turbine 10. For example, the sensors 88, 90 may include blade sensors for measuring a pitch angle of one of the rotor blades 22 or for measuring a loading acting on one of the rotor blades 22; generator sensors for monitoring the generator 42 (e.g., torque, rotational speed, acceleration and/or the power output); and/or various wind sensors for measuring various wind parameters. In addition, the sensors 88, 90 may be located near the ground of the wind turbine 10, on the nacelle 16, and/or on the meteorological mast 58.

It should also be understood that any other number or type of sensors may be employed and at any location. For example, the sensors 88, 90 may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 88, 90 may, for example, be used to generate signals relating to the parameter being monitored, which can then be utilized by the controller to determine the actual condition.

Figure 4:
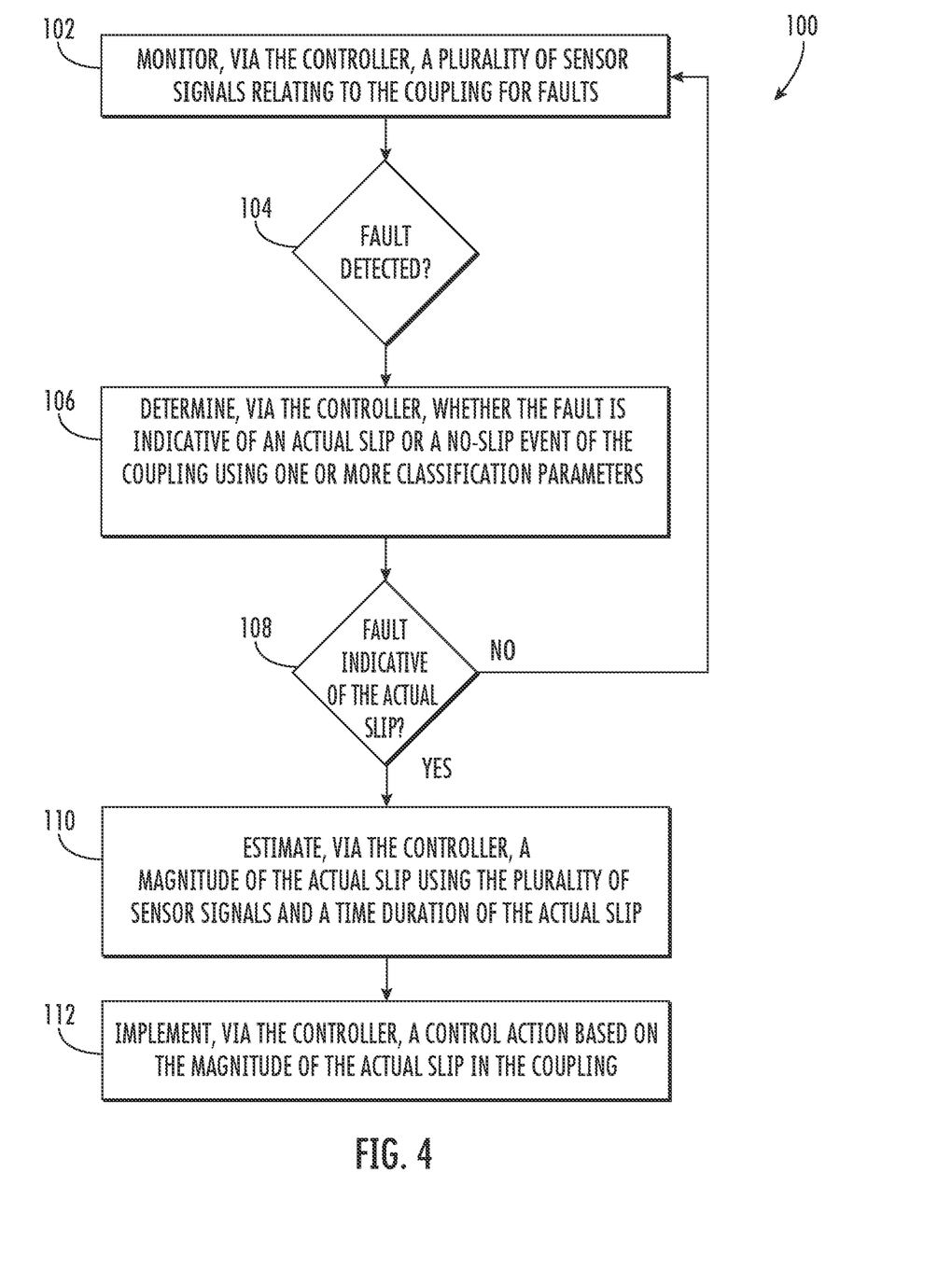
FIG. 4 illustrates a flow diagram of one embodiment of a method for detecting actual slip in a coupling of a wind turbine power system according to the present disclosure.

Referring now to FIGS. 4-8, the present disclosure is directed to a method 100 and a system 200 for detecting actual slip in a coupling of a wind turbine 10, such as the coupling 50 on the high-speed shaft 48. In general, the method 100 will be described herein with reference to the wind turbine 10 described above with reference to FIGS. 1-3. However, it should be appreciated by those of ordinary skill in the art that the disclosed method 100 may generally be utilized with any wind turbine having any suitable configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 includes monitoring, via the controller 36, a plurality of sensor signals relating to the coupling for faults. For example, in an embodiment, the sensor signals may include, for example, generator speed, rotor speed, generator torque demand, drivetrain acceleration, one or more electrical signals (e.g., current, voltage, etc.), wind speed, pitch angle, a system operational state, and/or functions thereof. In particular embodiments, the plurality of sensor signals may be raw measurements from one or more sensors, such as sensors 88, 90 of the wind turbine 10. In addition, or in the alternative, the method 100 may include processing the plurality of sensor signals using one or more processing algorithms.

As shown at (104), the method 100 includes determining whether a fault is detected in the sensor signals. In response to detecting a fault in the plurality of sensor signals relating to the coupling, as shown at (106), the method 100 includes determining, via the controller 36, whether the fault is indicative of an actual slip or a no-slip event of the coupling 50 using one or more classification parameters. For example, in an embodiment, the classification parameter(s) may include a difference in amplitude in the plurality of sensor signals, a rate of change in the plurality of sensor signals, an absolute value of the plurality of sensor signals, statistical analysis of the plurality of sensor signals, and/or similar.

In particular embodiments, for example, the controller 36 may determine whether the fault is indicative of the actual slip or the no-slip event of the coupling using the difference in the amplitude in the plurality of sensor signals, the rate of change in the plurality of sensor signals, the absolute value of the plurality of sensor signals, or statistical analysis of the plurality of sensor signals to detect a difference between the faults having actual slip and the faults having only no-slip events.

Referring still to FIG. 4, as shown at (108), the method 100 determines that the fault is indicative of the actual slip. Thus, as shown at (110), the method 100 includes estimating, via the controller 36, a magnitude of the actual slip using the plurality of sensor signals and a time duration of the actual slip. For example, in an embodiment, the method 100 may include estimating the magnitude of the actual slip using the plurality of sensor signals and the time duration of the actual slip via at least one of a computer-implemented model 210 programmed in the controller 36 or a cloud server. Thus, such estimation can be performed online or offline. Moreover, as shown at (112), the method 100 includes implementing, via the controller 36, a control action based on the magnitude of the actual slip in the coupling 50.

Figure 5:
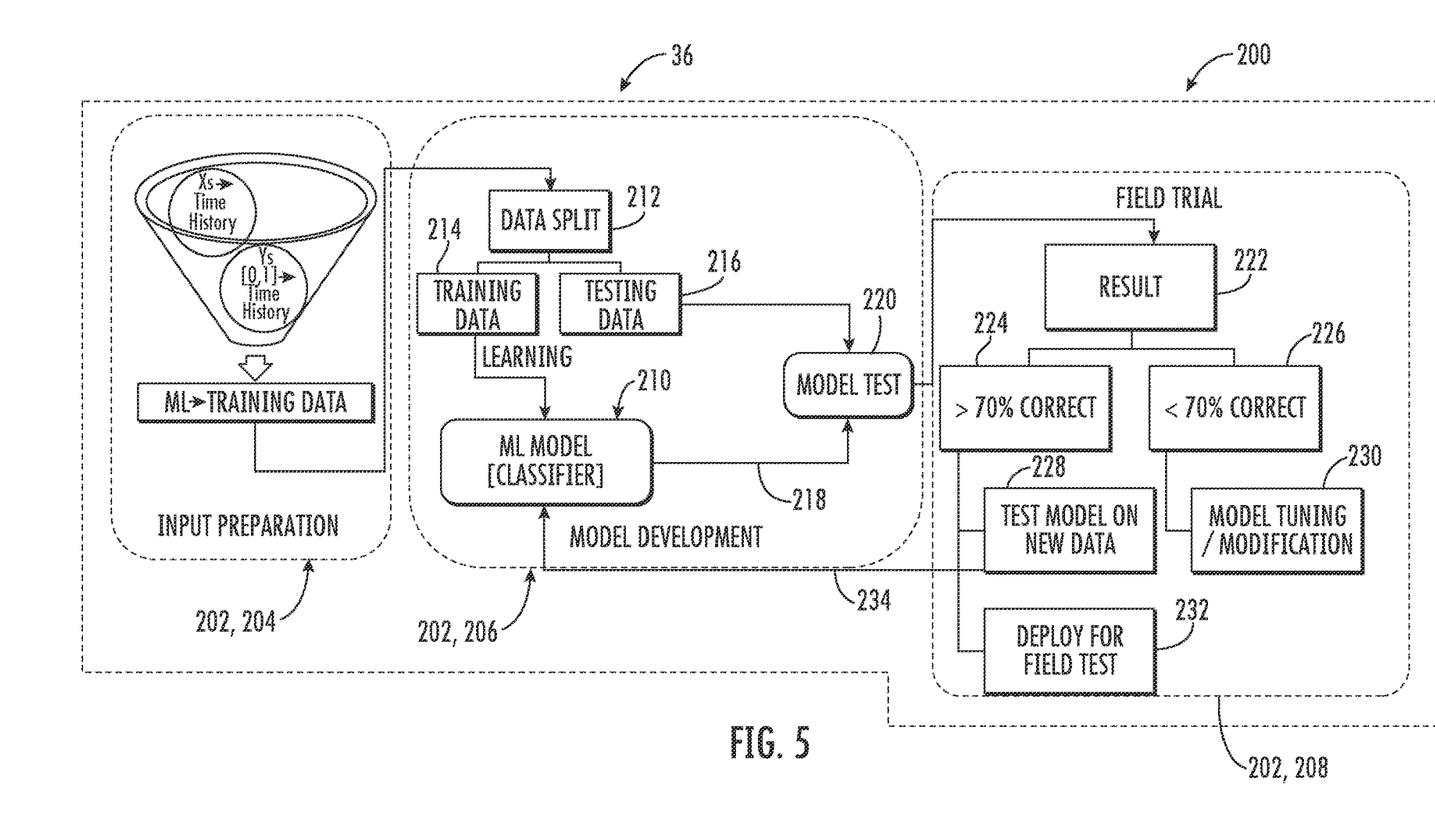
FIG. 5 illustrates a schematic diagram of one embodiment of an implementation of a computer-implemented model of a system for detecting actual slip in a coupling of a wind turbine power system according to the present disclosure.

Systems and methods of the present disclosure can now be further understood with reference to FIGS. 5-8. For example, as shown in FIG. 5, a schematic diagram of one embodiment of the system 200 for detecting actual slip in a coupling of rotary shaft, such as the coupling 50 on the high-speed shaft 48 is illustrated. As shown, the system 200 may include the controller 36 having various computer modules 202 for implementing the method steps described herein.

In particular, as shown, an input preparation module 204 is configured to receive the plurality of sensor signals relating to the coupling for faults. In addition, the input preparation module 204 may use machine learning or artificial intelligence for training the input data. Moreover, as shown in the illustrated embodiment, the system 200 may include a model development module 206 that includes the computer-implemented model(s) 210. Thus, in an embodiment, as shown, the model development module 206 receives the input data from the input preparation module 204 and may develop the computer-implemented model(s) 210. In several embodiments, the system 200 may develop the computer-implemented model(s) 210 prior to monitoring the plurality of sensor signals relating to the coupling for faults. More specifically, as shown, the input preparation module 204 may split the data into two data sets as shown at 212, for example, into a training data 214 and a testing data 216. In such embodiments, as shown, the system 200 may train the computer-implemented model(s) 210 using, at least, the training data 214. In an embodiment, the training data 214 may include, for example, data from the wind turbine 10, another wind turbine in the same wind farm, and/or historical data.

Accordingly, in such embodiments, the training data 214 can be used for learning of (or training of) the computer-implemented model(s) 210. Moreover, in certain embodiments, the computer-implemented model(s) 210 may include a supervised learning-based algorithm, such as a machine learning algorithm or artificial intelligence. Furthermore, as shown, the testing data 216 can be used, along with an output 218 of the supervised learning-based algorithm of the computer-implemented model(s) 210, as inputs to a model test 220 for testing the computer-implemented model(s) 210. In another embodiment, the system 200 may also continuously train and update the computer-implemented model(s) 210 using the training data 214, the testing data 216, the output data 218 from the supervised learning-based algorithm, and/or new learning data 234.

In such embodiments, the model test 220 is configured to provide a result 222 that indicates whether the computer-implemented model(s) 210 is ready for implementing on-site of the wind turbine 10. More specifically, as shown, the system 200 may further include a field trial module 208 that evaluates the result 222 by comparing an accuracy of the computer-implemented model(s) 210 (e.g., the result 222) with an accuracy threshold for the time duration. For example, as shown at 224, when the accuracy of the computer-implemented model(s) 210 is greater than the accuracy threshold (e.g., greater than 70% correct), the system 200 is configured to further train the computer-implemented model(s) 210 with the new learning data 234 from the time duration and then deploy for field testing (as shown at 228 and 232). In contrast, when the accuracy of the computer-implemented model(s) 210 is less than the accuracy threshold (e.g., less than 70% correct), as shown at 226, the system 200 is configured to tune or modify the computer-implemented model or receiving additional data (as shown at 230).

Figure 6:
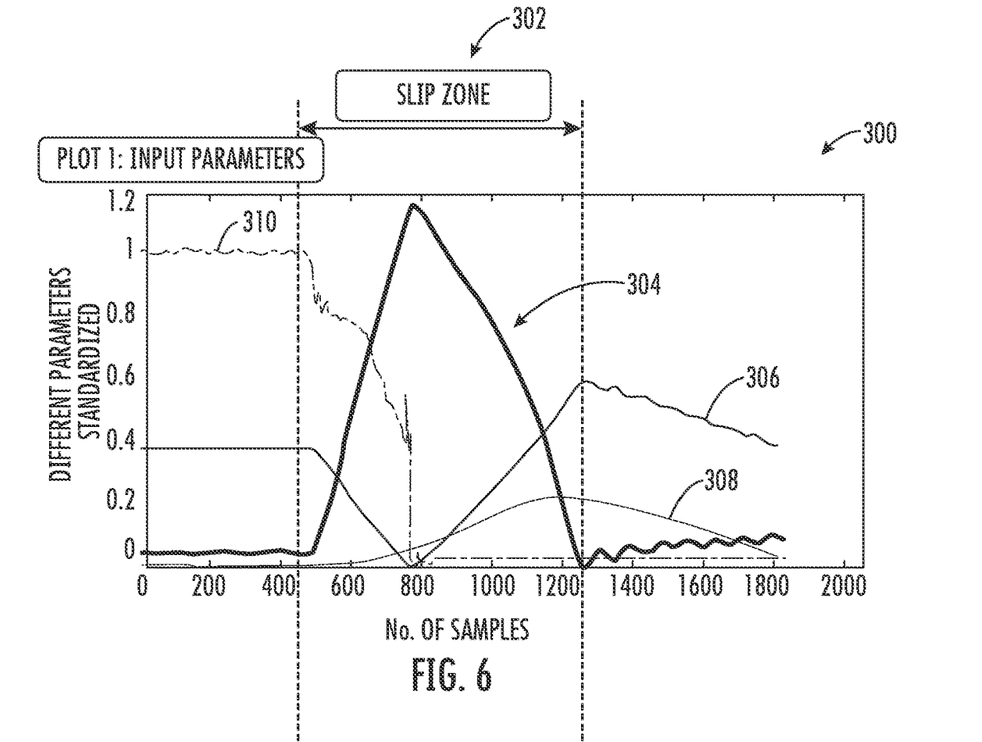
FIG. 6 illustrates a graph of one embodiment of a plurality of sensor signals (y-axis) versus a number of samples (x-axis) according to the present disclosure, particularly illustrating a slip zone containing a slip event of a coupling of a wind turbine power system.
Figure 7:
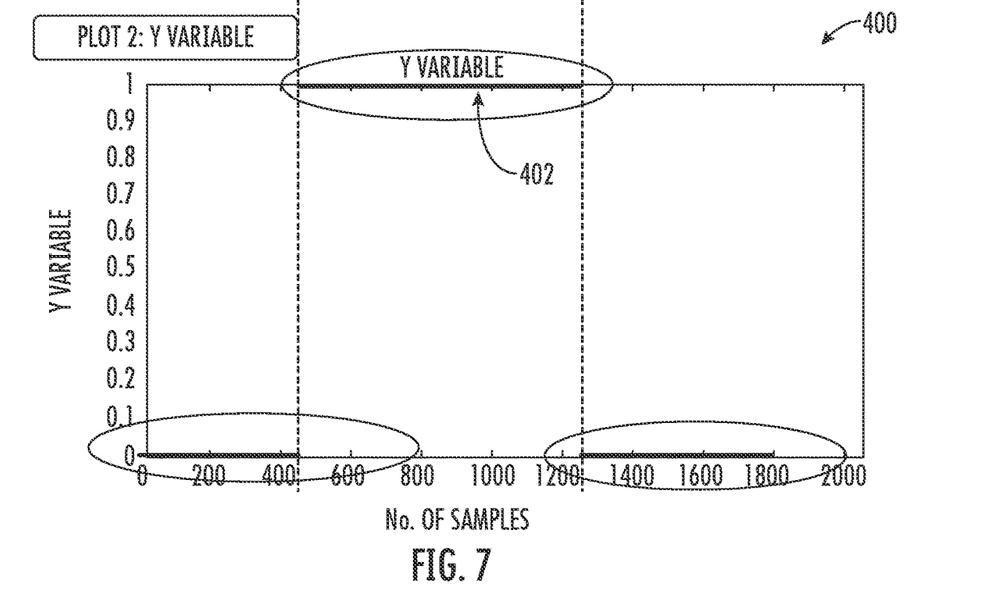
FIG. 7 illustrates a graph of one embodiment of a Y-variable (y-axis) versus a number of samples (x-axis) according to the present disclosure, particularly illustrating the Y-variable being indicative of an actual slip event of a coupling of a wind turbine power system.
Figure 8:
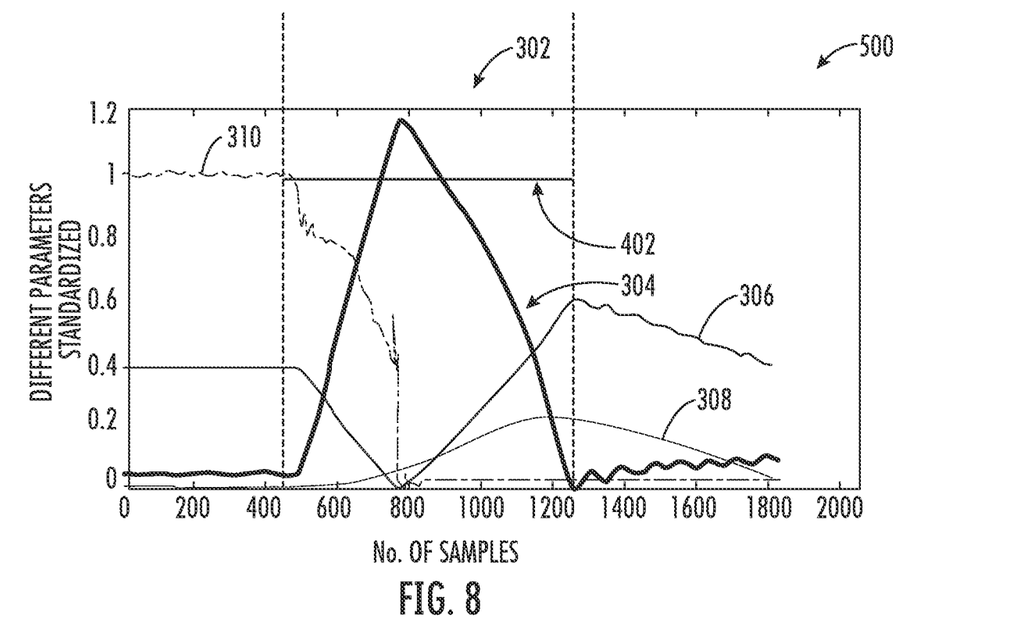
FIG. 8 illustrates a graph of one embodiment of a combination of the graphs from FIGS. 6 and 7, which is used as an input parameter of a computer-implemented model to determine whether an actual slip event or a no slip event occurred in the coupling of a wind turbine power system.

Referring now to FIGS. 6-8, various graphs are illustrated to further explain systems and methods of the present disclosure. In particular, FIG. 6 illustrates a graph 300 of one embodiment of a plurality of sensor signals (y-axis) (input variables) versus a number of samples (x-axis) according to the present disclosure, particularly illustrating a slip zone 302 containing a slip event 304 of a coupling of a wind turbine power system. In particular, as shown in the illustrated embodiment, the plurality of sensor signals include the generator speed 306, rotor speed 308, and generator torque demand 310. FIG. 7 illustrates a graph 400 of one embodiment of a Y-variable (y-axis) versus a number of samples (x-axis) according to the present disclosure, particularly illustrating the Y-variable being indicative of an actual slip event 402 in the slip zone 302 of a coupling of a wind turbine 10. In particular, as shown, outside of the slip zone 302, the Y-variable is equal to zero (0), whereas, in the slip zone 302, the Y-variable is equal to one (1). Thus, FIG. 8 illustrates a graph 500 of one embodiment of a combination of the graphs from FIGS. 6 and 7, which can be used as an input parameter of the computer-implemented model 210 to determine whether an actual slip event or a no slip event occurred in the coupling of a wind turbine 10. Accordingly, since sensor signals such as generator speed 306, rotor speed 308, and generator torque demand 310 register significant change during slip events, these parameters can be monitored to detect slip events. However, since the same signals can register change during no-slip events, the present disclosure also includes monitoring the magnitude of the change and/or the rate of change of such signals to distinguish between actual slip events and no-slip events.

Exemplary embodiments of systems for drive train of wind turbines are described above in detail. The systems are not limited to the specific embodiments described herein, but rather, components of the systems may be utilized independently and separately from other components described herein. Rather, an embodiment can be implemented and utilized in connection with many other rotor blade applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Various aspects and embodiments of the present invention are defined by the following numbered clauses:

Clause 1. A method for detecting actual slip in a coupling of a rotary shaft, the method comprising:

monitoring, via a controller, a plurality of sensor signals relating to the coupling for faults;

in response to detecting a fault in the plurality of sensor signals relating to the coupling, determining, via the controller, whether the fault is indicative of an actual slip or a no-slip event of the coupling using one or more classification parameters;

when the fault is indicative of the actual slip, estimating, via the controller, a magnitude of the actual slip using the plurality of sensor signals and a time duration of the actual slip; and implementing, via the controller, a control action based on the magnitude of the actual slip in the coupling.

Clause 2. The method of clause 1, wherein the plurality of sensor signals comprise at least one of generator speed, rotor speed, generator torque demand, drivetrain acceleration, one or more electrical signals, wind speed, pitch angle, a system operational state, or functions thereof.

Clause 3. The method of any of the preceding clauses, wherein the one or more classification parameters comprise at least one of a difference in amplitude in the plurality of sensor signals, a rate of change in the plurality of sensor signals, an absolute value of the plurality of sensor signals, or statistical analysis of the plurality of sensor signals.

Clause 4. The method of clause 3, wherein determining whether the fault is indicative of the actual slip or the no-slip event of the coupling using one or more classification parameter further comprises:

using at least one of the difference in the amplitude in the plurality of sensor signals, the rate of change in the plurality of sensor signals, the absolute value of the plurality of sensor signals, or the statistical analysis of the plurality of sensor signals to detect a difference between the faults having actual slip and the faults having only no-slip events.

Clause 5. The method of any of the preceding clauses, further comprising estimating the magnitude of the actual slip using the plurality of sensor signals and the time duration of the actual slip via at least one of a computer-implemented model programmed in the controller or a cloud server.

Clause 6. The method of clause 5, further comprising developing the computer-implemented model using training data and testing data.

Clause 7. The method of clause 6, wherein developing the computer-implemented model using training data and testing data further comprises:

training the computer-implemented model using, at least, the training data, the computer-implemented model comprising one or more supervised learning-based algorithms; and, testing the computer-implemented model using the testing data and output data from the one or more supervised learning-based algorithms.

Clause 8. The method of clause 7, further comprising:

comparing an accuracy of the computer-implemented model with an accuracy threshold for the time duration;

when the accuracy of the computer-implemented model is greater than the accuracy threshold, optionally further training the computer-implemented model with new learning data from the time duration; and, when the accuracy of the computer-implemented model is less than the accuracy threshold, tuning the computer-implemented model or receiving additional data.

Clause 9. The method of clause 6, further comprising developing the computer-implemented model using the training data and the testing data prior to monitoring the plurality of sensor signals relating to the coupling for faults.

Clause 10. The method of clause 8, further comprising continuously training and updating the computer-implemented model using the training data, the testing data, the output data from the supervised learning-based algorithm, and the new learning data.

Clause 11. The method of any of the preceding clauses, wherein the plurality of sensor signals are raw measurements from one or more sensors.

Clause 12. The method of any of the preceding clauses, further comprising processing the plurality of sensor signals using one or more processing algorithms.

Clause 13. The method of any of the preceding clauses, wherein the rotary shaft is a high-speed shaft of a generator of a wind turbine power system.

Clause 14. A system for detecting actual slip in a coupling of a rotary shaft of a wind turbine power system, the system comprising:

a controller comprising at least one processor having at least one computer-implemented model programmed therein, the at least one computer-implemented model configured to implement a plurality of operations, the plurality of operations comprising:

receiving a plurality of sensor signals relating to the coupling for faults;

in response to detecting a fault in the plurality of sensor signals relating to the coupling, determining whether the fault is indicative of an actual slip or a no-slip event of the coupling using one or more classification parameters; and when the fault is indicative of the actual slip, estimating, via the computer-implemented model, a magnitude of the actual slip using the plurality of sensor signals and a time duration of the actual slip, wherein the at least one processor is configured to implement a control action based on the magnitude of the actual slip in the coupling.

Clause 15. The system of clause 14, wherein the plurality of sensor signals comprise at least one of generator speed, rotor speed, generator torque demand, drivetrain acceleration, one or more electrical signals, wind speed, pitch angle, a system operational state, or functions thereof.

Clause 16. The system of clauses 14-15, wherein the one or more classification parameters comprise at least one of a difference in amplitude in the plurality of sensor signals, a rate of change in the plurality of sensor signals, or an absolute value of the plurality of sensor signals.

Clause 17. The system of clause 16, wherein determining whether the fault is indicative of the actual slip or the no-slip event of the coupling using one or more classification parameter further comprises:

using at least one of the difference in the amplitude in the plurality of sensor signals, the rate of change in the plurality of sensor signals, or the absolute value of the plurality of sensor signals to detect a difference between the faults having actual slip and the faults having only no-slip events.

Clause 18. The system of clauses 14-17, wherein the plurality of operations further comprises:

developing the computer-implemented model using training data and testing data.

Clause 19. The system of clause 18, wherein developing the computer-implemented model using training data and testing data further comprises:

training the computer-implemented model using, at least, the training data, the computer-implemented model comprising a supervised learning-based algorithm; and, testing the computer-implemented model using the testing data and output data from the supervised learning-based algorithm.

Clause 20. The system of clause 19, wherein the plurality of operations further comprises:

comparing an accuracy of the computer-implemented model with an accuracy threshold for the time duration;

when the accuracy of the computer-implemented model is greater than the accuracy threshold, further training the computer-implemented model with new learning data from the time duration; and, when the accuracy of the computer-implemented model is less than the accuracy threshold, tuning the computer-implemented model or receiving additional data;

developing the computer-implemented model using the training data and the testing data prior to monitoring the plurality of sensor signals relating to the coupling for faults; and continuously training and updating the computer-implemented model using the training data, the testing data, the output data from the supervised learning-based algorithm, and the new learning data.

This written description uses examples to disclose the disclosure, including the best mode, and also to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for detecting actual slip in a coupling of a rotary shaft in a wind turbine, the method comprising:
   receiving, via a controller, a plurality of sensor signals relating to the coupling for faults;
   in response to detecting a fault in the plurality of sensor signals relating to the coupling, determining, via the controller, whether the fault is indicative of an actual slip or a no-slip event of the coupling using one or more classification parameters;
   when the fault is indicative of the actual slip, estimating, via a computer-implemented model programmed in the controller, a magnitude of the actual slip using the plurality of sensor signals and a time duration of the actual slip; and
   implementing, via the controller, a control action based on the magnitude of the actual slip in the coupling,
   wherein the computer-implemented model is developed prior to receiving the plurality of sensor signals relating to the coupling of faults, and
   wherein the control action comprises controlling a pitch drive system to adjust a pitch angle of at least one rotor blade of a plurality of rotor blades of the wind turbine or controlling a yaw drive mechanism of the wind turbine,
   wherein the one or more classification parameters comprise at least one of a difference in amplitude in the plurality of sensor signals, a rate of change in the plurality of sensor signals, an absolute value of the plurality of sensor signals, or statistical analysis of the plurality of sensor signals,
   wherein determining whether the fault is indicative of the actual slip or the no-slip event of the coupling using the one or more classification parameter further comprises:
      using at least one of the difference in the amplitude in the plurality of sensor signals, the rate of change in the plurality of sensor signals, the absolute value of the plurality of sensor signals, or the statistical analysis of the plurality of sensor signals to detect a difference between faults having actual slip and faults having only no-slip events.

2. The method of claim 1, wherein the plurality of sensor signals comprise at least one of generator speed, rotor speed, generator torque demand, drivetrain acceleration, one or more electrical signals, wind speed, pitch angle, a system operational state, or functions thereof.

3. The method of claim 1, further comprising developing the computer-implemented model using training data and testing data.

4. The method of claim 3, wherein developing the computer-implemented model using training data and testing data further comprises:
   training the computer-implemented model using, at least, the training data, the computer-implemented model comprising one or more supervised learning-based algorithms; and,
   testing the computer-implemented model using the testing data and output data from the one or more supervised learning-based algorithms.

5. The method of claim 4, further comprising:
   comparing an accuracy of the computer-implemented model with an accuracy threshold for the time duration;
   when the accuracy of the computer-implemented model is greater than the accuracy threshold, optionally further training the computer-implemented model with new learning data from the time duration; and,
   when the accuracy of the computer-implemented model is less than the accuracy threshold, tuning the computer-implemented model or receiving additional data.

6. The method of claim 3, further comprising developing the computer-implemented model using the training data and the testing data prior to monitoring the plurality of sensor signals relating to the coupling for faults.

7. The method of claim 5, further comprising continuously training and updating the computer-implemented model using the training data, the testing data, the output data from the supervised learning-based algorithm, and the new learning data.

8. The method of claim 1, wherein the plurality of sensor signals are raw measurements from one or more sensors.

9. The method of claim 1, further comprising processing the plurality of sensor signals using one or more processing algorithms.

10. The method of claim 1, wherein the rotary shaft is a high-speed shaft of a generator of a wind turbine power system.

11. A system for detecting actual slip in a coupling of a rotary shaft of a wind turbine power system, the system comprising:
   a controller comprising at least one processor having at least one computer-implemented model programmed therein, the at least one computer-implemented model configured to implement a plurality of operations, the plurality of operations comprising:
      receiving a plurality of sensor signals relating to the coupling for faults;
      in response to detecting a fault in the plurality of sensor signals relating to the coupling, determining whether the fault is indicative of an actual slip or a no-slip event of the coupling using one or more classification parameters;
      when the fault is indicative of the actual slip, estimating, via the computer-implemented model, a magnitude of the actual slip using the plurality of sensor signals and a time duration of the actual slip, wherein the computer-implemented model is developed prior to receiving the plurality of sensor signals relating to the coupling of faults,
   wherein the at least one processor is configured to implement a control action based on the magnitude of the actual slip in the coupling, the control action comprising controlling a pitch drive system to adjust a pitch angle of at least one rotor blade of a plurality of rotor blades of the wind turbine or controlling a yaw drive mechanism of the wind turbine, wherein the one or more classification parameters comprise at least one of a difference in amplitude in the plurality of sensor signals, a rate of change in the plurality of sensor signals, or an absolute value of the plurality of sensor signals, wherein determining whether the fault is indicative of the actual slip or the no-slip event of the coupling using the one or more classification parameter further comprises:
using at least one of the difference in the amplitude in the plurality of sensor signals, the rate of change in the plurality of sensor signals, or the absolute value of the plurality of sensor signals to detect a difference between faults having actual slip and faults having only no-slip events.

12. The system of claim 11, wherein the plurality of sensor signals comprise at least one of generator speed, rotor speed, generator torque demand, drivetrain acceleration, one or more electrical signals, wind speed, pitch angle, a system operational state, or functions thereof.

13. The system of claim 11, wherein the plurality of operations further comprises:
developing the computer-implemented model using training data and testing data.

14. The system of claim 13, wherein developing the computer-implemented model using training data and testing data further comprises:

training the computer-implemented model using, at least, the training data, the computer-implemented model comprising a supervised learning-based algorithm; and,
testing the computer-implemented model using the testing data and output data from the supervised learning-based algorithm.

15. The system of claim 14, wherein the plurality of operations further comprises:
comparing an accuracy of the computer-implemented model with an accuracy threshold for the time duration;
when the accuracy of the computer-implemented model is greater than the accuracy threshold, further training the computer-implemented model with new learning data from the time duration; and,
when the accuracy of the computer-implemented model is less than the accuracy threshold, tuning the computer-implemented model or receiving additional data;
developing the computer-implemented model using the training data and the testing data prior to monitoring the plurality of sensor signals relating to the coupling for faults; and
continuously training and updating the computer-implemented model using the training data, the testing data, the output data from the supervised learning-based algorithm, and the new learning data.

* * * * *